US010596922B2

(12) United States Patent
Heinen

(10) Patent No.: US 10,596,922 B2
(45) Date of Patent: Mar. 24, 2020

(54) METHOD AND SYSTEM FOR UTILIZATION OF REGENERATIVE BRAKING ENERGY OF RAIL VEHICLES

(71) Applicant: Hedgehog Applications B.V., Apeldoorn (NL)

(72) Inventor: Adrianus Johannes Heinen, Apeldoorn (NL)

(73) Assignee: HEDGEHOG APPLICATIONS B.V., Apeldoorn (NL)

( * ) Notice: Subject to any disclaimer, the term of this patent is extended or adjusted under 35 U.S.C. 154(b) by 619 days.

(21) Appl. No.: 14/897,739

(22) PCT Filed: Mar. 18, 2014

(86) PCT No.: PCT/NL2014/050160
§ 371 (c)(1),
(2) Date: Dec. 11, 2015

(87) PCT Pub. No.: WO2014/200335
PCT Pub. Date: Dec. 18, 2014

(65) Prior Publication Data
US 2016/0114701 A1    Apr. 28, 2016

(30) Foreign Application Priority Data
Jun. 14, 2013 (NL) ..................... 2010983

(51) Int. Cl.
*B60M 3/06* (2006.01)
*B60L 5/38* (2006.01)
(Continued)

(52) U.S. Cl.
CPC ............... *B60M 3/06* (2013.01); *B60L 5/38* (2013.01); *B60M 7/003* (2013.01); *B61H 9/06* (2013.01)

(58) Field of Classification Search
CPC ........ B60L 5/38; B60L 11/18; B60L 11/1811; B60L 11/1812; B60L 11/1814;
(Continued)

(56) References Cited

U.S. PATENT DOCUMENTS 3,955,657 A * 5/1976 Bossi ..................... B60L 5/42
191/2
8,550,007 B2 * 10/2013 Mazumdar ............... B60L 7/10
104/289
(Continued)

FOREIGN PATENT DOCUMENTS

CN    102753383    10/2012
EP    1985490    10/2008
(Continued)

OTHER PUBLICATIONS

"Wayside Energy Storage Project" (http://www.septa.org/sustain/blog/2011/07-15.html)—published prior to May 9, 2013.
(Continued)

Primary Examiner — Zachary L Kuhfuss
(74) Attorney, Agent, or Firm — Dann Dorfman Herrell and Skillman; Niels Haun

(57) ABSTRACT

The invention relates to an energy distribution and consumption system comprising: a group of rail vehicles provided with regenerative braking means; a group of electrically powered bus vehicles each comprising an onboard battery; an electrical energy storage means adapted for storing electrical energy generated by a rail vehicle during braking thereof; a plurality of charging stations, each adapted for connecting to a bus vehicle, for charging the onboard battery thereof with electrical energy from said electrical energy storage means; wherein said group of rail vehicles is adapted for providing a substantially predetermined net supply of electrical energy to said electrical energy storage means during a predetermined time period, wherein said group of
(Continued)

bus vehicles is adapted for substantially consuming at least said net amount of electrical energy within said predetermined time period.

18 Claims, 6 Drawing Sheets

(51) Int. Cl.
*B60M 7/00* (2006.01)
*B61H 9/06* (2006.01)

(58) Field of Classification Search
CPC ...... B60L 11/1803; B60M 3/06; B60M 7/003; B61H 9/06
USPC .............................................................. 191/2
See application file for complete search history.

(56) References Cited

U.S. PATENT DOCUMENTS

| | | | | |
|---|---|---|---|---|
| 8,550,008 | B2 * | 10/2013 | Mazumdar | B60L 7/10 104/289 |
| 2009/0039656 | A1 | 2/2009 | Farley et al. | |
| 2011/0307113 | A1 * | 12/2011 | Kumar | B60M 3/00 700/291 |
| 2012/0007542 | A1 * | 1/2012 | Jammer | B60L 11/1824 320/101 |
| 2012/0175209 | A1 * | 7/2012 | Mazumdar | B60L 7/10 191/2 |
| 2013/0244063 | A1 * | 9/2013 | Dhar | H01M 16/00 429/9 |

FOREIGN PATENT DOCUMENTS

| | | | |
|---|---|---|---|
| EP | 1985490 A1 * | 10/2008 | ............... B60L 7/10 |
| EP | 1977668 | 12/2008 | |
| EP | 2476573 | 7/2012 | |
| EP | 2693598 | 2/2014 | |
| EP | 2749447 A1 * | 7/2014 | ............... B60L 9/00 |
| EP | 2768071 | 8/2014 | |
| GB | 2477166 | 7/2011 | |
| JP | 2000078702 | 3/2000 | |
| JP | 2010-023785 | 2/2010 | |
| JP | 2010-132209 | 6/2010 | |
| JP | 2010132209 | 6/2010 | |
| JP | 2011-526858 | 10/2011 | |
| JP | 2012-080628 | 4/2012 | |
| JP | 2012-236436 | 12/2012 | |
| JP | 2014-533214 | 12/2014 | |
| JP | WO2013-054795 | 3/2015 | |
| KR | 1020110000633 | 1/2011 | |
| KR | 10-2011-0089581 | 10/2012 | |
| KR | 10-1194302 | 10/2012 | |
| KR | 1011943020000 | 10/2012 | |
| WO | 2010/003021 | 1/2010 | |
| WO | 2011/049661 | 4/2011 | |
| WO | 2012/131141 | 10/2012 | |
| WO | 2012153755 | 11/2012 | |
| WO | 2013/036019 | 3/2013 | |

OTHER PUBLICATIONS

"SEPTA Captures Regenerative Braking Energy from Trains" (http://www.metro-magazine.com/rail/news/288665/septa)—published prior to May 9, 2013.
"SEPTA Energy Pilot to Reduce Emissions, Generate $500K" (http://www.metro-magazine.com/rail/news/285420/septa-energy-recycling-pilot-could-generate-500k)—published prior to May 9, 2013.
International Preliminary Report on Patentability issued in PCT/NL2014/050160 dated May 19, 2015.
Official Action issued in Chinese Patent Application No. 2014800336294 dated Feb. 23, 2017.
English translation of a Decision of Patent issued in Japanese Patent Application No. 2016-519469 on May 15, 2018.
Official Action issued in Korean Application No. 10-2015-7035412 dated Dec. 12, 2019.

* cited by examiner

METHOD AND SYSTEM FOR UTILIZATION OF REGENERATIVE BRAKING ENERGY OF RAIL VEHICLES

BACKGROUND

The invention relates to a method for utilization of braking energy generated by rail vehicles which comprise regenerative braking means for converting braking energy of said rail vehicles into electrical energy, in particular when said rail vehicles brake and/or decelerate at a railway station or close thereto. The present invention further relates to an energy consumption and distribution system for consumption and distribution of such electrical energy generated by regenerative braking means of rail vehicles.

Systems for recovering braking energy of rail vehicles are known, for instance from EP 1 985 490 which describes an energy recovery system comprising a rail vehicle on a track, e.g. a train vehicle, which is electrically connected, via a pantograph, to a power supply line to collect electrical power there from. The rail vehicle is provided with an electric motor adapted to rotate the wheels of the rail vehicle when provided with electric power. During braking of the rail vehicle the motor may be operated as a generator for generating electrical energy, in which case the electrical energy generated during braking is returned to the power supply line. The known system further comprises power supply stations which are arranged at predetermined locations along the track, for supplying electrical energy from an electrical grid to the rail vehicle, and for receiving electrical energy from the rail vehicle during braking and transporting this energy back to the electrical grid. In an embodiment, a portion of the energy which is generated during braking of a rail vehicle is directly used for powering acceleration of another rail vehicle and the remaining portion of regenerated energy is transported, via the power supply stations, back to the electrical grid.

A drawback of the known system is that, in order to convert the electrical energy generated during braking of a rail vehicle into a form of energy suitable for transport within the electrical grid, a complex voltage regulation system and/or power converter is required at the power supply stations. Power supply stations are typically adapted for receiving electrical energy from the electrical grid at a first voltage, for instance a voltage of 10.000 V, at which electrical energy is transported within the electrical grid, and for converting this energy into electrical energy suitable for driving a rail vehicle at a substantially lower second voltage, e.g. a voltage of 1.500 V. During braking, the rail vehicle generates electrical energy at a third voltage which is between the first voltage and the second voltage, e.g. the rail vehicle generates a voltage in a range of about 1.600-1.900 V during braking. Consequently, besides converting electrical energy from the first voltage to the second voltage, in the known system the power converter and/or voltage regulation system must also be adapted for converting energy from the third voltage to the first voltage.

It is an object of the present invention to provide a more simple method and system for utilization of braking energy of rail vehicles, allowing efficient use thereof.

SUMMARY OF THE INVENTION

To this end, according to a first aspect, the present invention provides a method for utilization of braking energy of a group of rail vehicles each provided with regenerative braking means for generating electrical energy during braking, wherein said group of rail vehicles is adapted for providing a substantially predetermined net supply of electrical energy to energy storage means during a predetermined period of time, said method, during said predetermined period of time, comprising the steps of:

storing electrical energy generated during braking by the regenerative braking means in said energy storage means, transferring said net amount of electrical energy from said energy storage means to onboard batteries of a group electrically powered buses, wherein said energy storage means are spaced apart from said rail vehicles and said electrically powered buses, and wherein said transfer of electrical energy from said energy storage means to said group of electrically powered buses is performed within a distance of 2 km from the energy storage means, preferably within a distance of 1 km, most preferably within a distance of 500 m.

Typically, the predetermined time period is an 18 or 24 hour time period during which the rail vehicles and electrically powered buses are scheduled in revenue service. The net supply of energy is substantially equal to an amount of energy supplied by the group of rail vehicles to the energy storage means minus an amount of energy—if any—drawn by said rail vehicles from the energy storage means during the predetermined period of time. For instance, if during a predetermined period of time of 18 hours four rail vehicles brake within the distance of 2 km from the energy storage means each hour, each generating 120 kWh when braking, then the total amount of energy generated by the regenerative braking means of the rail vehicles within said distance from the energy storage means is 120 kWh*hours*4=8.640 kWh. If, during the same predetermined time period, no energy is drawn from the energy storage means by rail vehicles, then the net amount of energy which is transferred to the energy storage means is substantially equal to the amount of generated energy, i.e. in this example substantially equal to 8.640 kWh.

As substantially the entire net amount of electrical energy is transferred to the onboard batteries of the electrically powered buses, substantially all of this net energy may be used for powering movement of said buses. Energy losses due to conversion are reduced as there is no need for converting the electrical energy to a form suitable for transport in an electricity grid before transferring the electrical energy to the onboard batteries of the electrically powered buses. The method according to the invention can thus be performed without altering existing power supply stations along a railway track.

Usually, transfer of energy generated by the regenerative braking means of a rail vehicle to the energy storage means for storing said energy therein takes place during braking of the rail vehicle within said distance.

In an embodiment the rail vehicles are adapted for receiving electrical energy from a power line section at a nominal voltage, wherein the energy storage means is directly connected to said power line section and adapted for storing the electrical energy at substantially said nominal voltage. During braking of a rail vehicle the electrical energy is thus transferred from the regenerative braking means thereof to the energy storage means via the power line section, which is typically a section or portion of a power supply line between two power supply stations which are arranged along a track on which the rail vehicle is traveling, and which are adapted for supplying electrical energy to the rail vehicle at said nominal voltage. The power line section is typically a conductor line or conductor strip which extends substantially parallel to a track over which the rail vehicle travels.

In an embodiment the rail vehicles are adapted to be powered through said power line section, wherein the power line section is connected on either side to power supply stations, which power supply stations are connected to an external electricity grid, and wherein electrical power flows from said electricity grid to said power line section, but not vice versa. Movement of a rail vehicle may thus be powered with energy from the grid e.g., but energy regenerated during braking of the rail vehicle is not transported back to the grid.

In an embodiment said predetermined time period is substantially equal to 24 hours, and during said predetermined time period the net amount of energy which is transferred to the onboard batteries of said group of electrically powered buses is 2.000 kWh or more, preferably at least 6.000 kWh.

In an embodiment, the net amount of energy is greater by at least a factor two, preferably at least by a factor three, than a maximum energy storage capacity of the energy storage means. For instance, even when a net amount of energy of 7.200 kWh is transferred from the energy storage means to the onboard batteries over the predetermined time period an energy storage means having a maximum energy storage capacity 2400 kWh will typically suffice.

In an embodiment, the energy storage means has a capacity rating (C-rating) of between 2.5C and 3.5C, preferably substantially equal to 3C. The C-rating provides an indication of the maximum current that can be drawn from, or supplied to, the energy storage means without causing damage thereto, when the energy storage capacity of the energy storage means is known. Likewise, when the maximum current that will be drawn from or supplied to the energy storage means by the rail vehicles, as well as a maximum voltage at which said current flows is known, the C-rating can be used to calculate a minimum energy storage capacity that the energy storage means should have to be able to cope with the maximum current at the maximum voltage, without causing damage to the energy storage means. Such a minimum required energy storage capacity may be calculated as the maximum current on said power line section during braking of one or more rail vehicles multiplied by the maximum voltage on said power line section generated during braking of said one or more rail vehicles, and divided by the C-rating of the energy storage means. For instance, when it is known that only one rail vehicle brakes at the same time along said power line section, and that the current supplied to the energy storage means during braking thereof is at most 4.000 A and is supplied at a voltage of at most 1.800 V, with the C-rating of the energy storage means being 3, then the energy storage means should be dimensioned to have a storage capacity of at least 4.000 A*1.800 V*(1 h/3)=2.4 MWh.

In an embodiment the onboard battery of each electrically powered bus is dimensioned for storing an amount of energy which is at least equal to a maximum power usage of said buses times 1 hour and divided by 2.5. For instance, when the maximum power usage of an electrically powered bus during acceleration is 180 kW, i.e. the amount of power drawn from the onboard battery at any time is 180 kW or less, then the onboard battery of the bus should have a capacity of at least 180 kW*1 h/2.5=72 kWh. The total energy consumption of each bus during the entire predetermined time period will typically be substantially higher than the total energy storage capacity of its onboard battery, e.g. at least by a factor 2.

When both the energy storage capacity of the onboard battery and the voltage used for charging said battery at a charging station are known, the maximum current that the onboard battery should be able to receive when charging at a charging station without damaging the onboard battery can be calculated by dividing the energy storage capacity of the onboard battery by the charging voltage. For instance, when the energy storage capacity is 72 kWh, and the voltage for charging the onboard battery at the charging station is 600 V, then the onboard battery should be able to receive 72 kWh/600 V=120 A of current without damage. The onboard batteries of the buses can thus be dimensioned based on the charging current that is available for transferring electrical energy from the energy storage thereto and/or based on a predetermined maximum energy usage of the electrically powered buses.

In an embodiment a difference between a maximum and minimum amount of energy stored by the energy storage means during the predetermined time period at any time is substantially less than a maximum energy storage capacity of the energy storage means, preferably at least by a factor 10 or 15. This may be achieved by timing transfers of electrical energy from the regenerative braking means to the energy storage means such that they are followed by energy transfers from the energy storage means to the onboard batteries of the electrically powered buses before the difference become greater than one tenth or one fifteenth of the maximum storage capacity of the energy storage means. Conversely, when estimates of transfers timings and corresponding energy transfer amounts are determined before the start of the predetermined time period, an energy storage means having a suitable maximum energy storage capacity may be selected based on said estimates.

In an embodiment, said rail vehicles stop at a railway station according to a predetermined schedule on which said predetermined time period is based, wherein the railway station and the one or more charging stations are within a distance of 2 km from the energy storage means, preferably within a distance of 1 km, most preferably within a distance of 500 m. An expected net amount of energy that is generated by the regenerative braking means can thus be calculated in advance based on the predetermined schedule for the rail vehicles. The number of electrically powered buses used during the same predetermined time period is preferably chosen such that they consume at least said expected net amount of energy. Usually, the expected energy consumption of these buses may be calculated in advance based on a predetermined bus schedule.

In an embodiment the one more charging stations are located at corresponding bus stops and said onboard batteries are partially recharged during stops of said electrically powered buses at said bus stops. As the onboard batteries are only partially recharged typically a greater amount of energy will be stored in the onboard batteries at the beginning of the predetermined time period than at the end thereof, even when the batteries are partially recharged at the charging stations several times during said predetermined time period. When the buses are not in revenue service, their onboard batteries may be recharged to at least the amount of energy held thereby at the beginning of the predetermined time period.

In an embodiment the transfer of electrical energy from the energy storage means to the electrically powered buses is effected using charging stations arranged at locations where passengers embark and/or disembark a bus a bus stop. Preferably, during the time of day wherein the buses are in revenue service, i.e. from the beginning to the end of bus times according to a bus schedule which typically substantially coincides with the predetermined period of time, each bus of the electrically powered buses is disconnected from a charging station as soon as it has been continuously connected to the charging station for longer than a predetermined time duration reserved for passengers to get on or off said bus. This time duration for embarkation/disembarkation is preferably less than 10 minutes, preferably less than 5 minutes. Thus, between the start of the bus schedule and the end of the bus schedule, a bus can remain in substantially constant operation without having to make additional stops for charging its onboard battery.

In an embodiment the transfer of energy from said energy storage means to said electrically powered buses is performed using one or more charging stations, preferably within a charging period of 6 minutes or less, preferably 3 minutes or less, after which said electrically powered bus remains disconnected from said charging stations for at least 8 or 9 times said charging period, after which the bus preferably returns to the one or more charging stations. For instance, when a bus has partially recharged its onboard battery at a charging station for 3 minutes, it will remain disconnected from all of said charging stations for at least another 24 or 27 minutes.

In an embodiment, the entire amount of time spend charging each bus at a charging station during the predetermined time period is less than one ninth or one tenth of the predetermined time period. For instance, during an entire predetermined time period a bus may return to a charging station on average after 27 minutes of driving around and then have its onboard batteries partially recharged for 3 minutes on average before leaving the charging station again.

In an embodiment a voltage of the electrical energy from said electrical energy storage means is converted, preferably at a charging station for charging the onboard battery of an electrically powered bus, at a position spaced apart from said electrical energy storage means, e.g. by 5 m or 10 m or more, to a voltage suitable for charging said one or more electrically powered buses or onboard batteries thereof. This conversion, which is preferably carried out using a supercharger, only has to take place when one or more of the electrically powered buses are charging at the charging stations.

In an embodiment the electrical energy generated by the regenerative braking means of the group of rail vehicles is used to charge at least 10, preferably at least 20, more preferably at least 30 of said electrically powered buses during the predetermined time period. These numbers of buses can consume the large amounts of net energy generated by the rail vehicles. Preferably over the duration the entire predetermined time period each bus is provided with at least 200 kWh of electrical energy from the energy storage means. For example, when during an entire predetermined time period 30 buses are each provided with 216 kWh of electrical energy from the energy storage means, these buses together draw 6.48 MWh from the energy storage means over said predetermined time period.

Most preferably, the number of electrically powered buses to be powered with the electrical energy which is converted during the predetermined period of time is at least substantially equal to the net amount of electrical energy divided by the average energy consumption of a bus of the group of electrically powered buses.

In embodiment the electrical energy storage means are located at a position of frequent braking and/or deceleration of said rail vehicles, e.g. at a railway station or railway stop. The charging stations are preferably arranged at bus stops proximate to said railway station, e.g. within a distance of 2 km thereof.

In an embodiment the energy storage means are stationary during said transfer of electrical energy from the electrical energy storage means to the group of electrically powered bus vehicles or onboard batteries thereof. The location of the energy storage means relative to the track thus does not change during said energy transfer.

In an embodiment, the energy transfer from the energy storage means to the group electrically powered buses is performed within a distance of 2 km of the energy storage means, preferably within a distance of 1 km, instead of within said distance of 500 m from the energy storage means.

According to a second aspect, the present invention provides an energy consumption and distribution system for use with a group of rail vehicles which are provided with regenerative braking means for generating electrical energy during braking, and a group of electrically powered buses, each bus comprising an electromotor for driving movement of wheels thereof and an onboard battery connected to said electromotor, said system comprising: a power line section, arranged for receiving electrical energy generated by the regenerative braking means of a rail vehicle of said group of rail vehicles during braking of said rail vehicle; an electrical energy storage means connected to said power line section and adapted for storing electrical energy received by said power line section during braking of said rail vehicle; a plurality of charging stations, each adapted for connecting to an electrically powered bus from said group of electrically powered buses, for charging the onboard battery thereof with electrical energy from said electrical energy storage means; wherein said electrical energy storage means, said power line section and said plurality of charging stations form an integrated system and are located within a distance of 2 km from each other, preferably within a distance of 1 km, most preferably within a distance of 500 m. The power line section is preferably located within a distance of 500 m of the energy storage means.

Because the components of the integrated system, i.e. the power line section, the electrical energy storage means, and the plurality of charging stations, are located close to each other, energy loss due to transportation of electrical energy is minimized. Moreover, as it is not necessary to make use of a converter for converting the voltage of the power line section to a voltage of the electrical energy storage means, energy loss due to conversion is minimized.

In an embodiment said electrical energy storage means is directly connected to said power line section, allowing a substantially free flow of electrical energy from the energy storage means to the power line section and vice versa. Thus, direct bi-directional exchange of electrical energy is possible between the energy storage means and said power line section. A portion of the energy stored in the energy storage means may thus be used for at least partially powering accelerating rail vehicles, without requiring conversion of the electrical energy, even when no rail vehicle is braking at the same time, and another portion can be used for charging one or more vehicles of the group of electrically powered buses. In this embodiment it is particularly advantageous if the energy storage means are adapted for storing said electrical energy at a voltage as a function of energy stored in the energy storage means, i.e. the more energy there is stored in the energy storage means, the higher the voltage at which said energy is stored. Thus, when the energy stored in the energy storage means is below a minimum threshold value, then the voltage at said energy storage means will be at a voltage which is lower than the nominal voltage applied to the power line section, and the energy storage means will receive electrical energy via the power line section. On the other hand, when a rail vehicle which is in contact with the power line section is accelerating, the voltage on the power line section drops below the voltage of the energy storage means. As a result, energy is supplied to the power line section from energy storage means, for powering acceleration of the rail vehicle.

In an embodiment the energy storage means and the power line section together form a free floating system so that energy can float, or be transferred, in any direction. The amount of energy supplied to the energy storage by the regenerative braking means of the group of rail vehicles is typically greater than the amount of energy drawn by these rail vehicles from the energy storage means during acceleration, resulting in a net supply of energy to the energy storage means thereby. This is partly because during braking substantially all of the electrical energy is received by the energy storage means, whereas during acceleration of a rail vehicle, at least a portion of the energy required for powering a rail vehicle is supplied by power supply stations.

In an embodiment said group of rail vehicles is adapted for providing a substantially predetermined net supply of electrical energy to said electrical energy storage means during a predetermined time period, wherein said group of electrically powered buses is adapted for substantially consuming at least said net amount of electrical energy within said predetermined time period.

The integrated system is preferably located at a public transport station comprising both a railway station for the rail vehicles and a bus station for the buses. The net amount of energy may then be determined before the start of the predetermined time period, e.g. at least a day in advance, based on train and bus schedules, electrical energy storage capacity of the buses and/or expected energy consumption of the buses over the predetermined period of time. The railway station and bus station comprising the plurality of charging stations are preferably located within walking distance from each other, e.g. within a distance of 2 km or less from each other.

During the predetermined time period, usually an 18 or 24 hour time period during which rail vehicles and buses are scheduled in revenue service, there are several times during which energy is supplied to the electrical energy storage means by the rail vehicles. Because the energy storage means act as an energy buffer the regenerated energy may be consumed in a more gradual manner for charging the onboard batteries of the electrical buses. For instance, during a predetermined time period which lasts about 18 hours, on average at least 4 rail vehicles may brake to a halt at the power line section each hour. During the same predetermined time period, electrically powered buses from the group of electrically powered buses may succeed each other at the charging stations, so that substantially at any time during the predetermined time period the onboard battery of at least one electrically powered bus is being charged with energy from the energy storage means.

As at least the net amount of electrical energy supplied to the energy storage means by the group of rail vehicles during the predetermined time period is consumed by the group of electrically powered buses during the same predetermined time period, it can be assured that none of the net amount of energy is lost due to lack of energy storage capacity. For instance, when during a predetermined period of time of 18 hours four rail vehicles brake at the power line section each hour, each generating 120 kWh when braking, then the total amount of energy generated by the regenerative braking means of the rail vehicles at the power line section is 8.640 kWh. If substantially all of this energy were to be stored in the energy storage means, and no energy were to flow back from the energy storage means to the power line section, then the net amount of energy supplied to the energy storage means during the predetermined time period is substantially equal to 8.640 kWh.

When the electrically powered buses, e.g. buses for local public transit, each consume on average 1 kWh/km and each drive on average 240 km during the same predetermined time period, then each bus consumes about 240 kWh each day, and the net energy supplied to the energy storage means is sufficient to power about 8.640/240=36 buses. A combined railway and bus station will typically provide space for at least such a number of buses and a corresponding number of charging stations, so that substantially all of the net energy can indeed be consumed. In case not all energy which is generated by the regenerative braking means and supplied to the power line section is used for powering buses, some of this energy may be used to power acceleration of rail vehicles which draw energy from the power line section.

Preferably, the energy consumption each of said electrically powered buses is at least 200 kWh during a predetermined time period of between 18 or 24 hours. If instead of electrically powered buses vehicles having a lower energy consumption were used such as electrically powered bicycles or electrically powered passenger automobile cars, then a substantially greater number of vehicles and charging stations would be required in order to ensure that the energy consumed by these vehicles, i.e. the energy used for charging the onboard batteries thereof, would be at least the same as the net energy supplied, to prevent waste of energy. For instance, assuming that an average electric car has an onboard battery with a capacity of 18 kWh, and that it takes about hours to fully charge this battery at a charging station, then about 3 such cars can be charged at a charging station during a predetermined time period of 18 hours in which net energy is supplied to the energy storage means. Thus, over the entire predetermined period of time, about 8.640 kWh/18 kWh=480 cars would have to be charging to have their batteries fully charged in order to consume all of the net energy supplied to the energy storage means, and 480/3=160 charging stations would be required. The prior art known to applicant does not suggest parking and charging such large numbers of electrical cars within a short distance of a railway station, e.g. at least within 2 km, preferably within 1 km, most preferably within a distance of 500 m from the railway station.

In an embodiment the power line section is connected at either end to a power supply station adapted for applying a nominal voltage to said power line section, wherein said regenerative braking means are adapted for, at least during braking, generating said electrical energy within a voltage range that is higher than said nominal voltage, and wherein said electrical energy storage means is adapted for storing said electrical energy at a voltage which is substantially equal to said nominal voltage. The nominal voltage is defined as a voltage supplied by the power supply stations to the power line section when substantially no rail vehicle is drawing power from the power line section, e.g. when there is no rail vehicle on a section of a track associated with the power line section.

The power supply stations are typically connected to an electrical grid which is separate from the integrated system of the present invention, i.e. no electrical energy is supplied from the integrated system to the electrical grid. These power supply stations may therefore function independently of the integrated system, i.e. be adapted for one-directional supply of energy to the power line section, and do not have to be adapted for receiving electrical energy from the power line section.

Preferably, the electrical energy storage means are adapted for receiving electrical energy from said power line section at a voltage in said voltage range.

In an embodiment said energy storage means are adapted for supplying electrical energy to said plurality of charging stations and/or said power line section, at substantially said nominal voltage.

In an embodiment the energy storage means is directly connected to said power line section and adapted for storing the electrical energy at substantially said nominal voltage or higher. The higher voltage is preferably less than the maximum voltage applied to the power line section during braking of a rail vehicle. Energy storage means, such as a battery, may thus be used having poles at a potential difference substantially equal to or higher than the nominal voltage. Typically, when a rail vehicle is travelling at constant speed it receives electrical energy from the power line section at a voltage substantially equal to 1.500 V. In such a case, the energy storage means is preferably adapted for storing electrical energy at an voltage of 1.500 V or slightly higher, e.g. substantially at 1.550 V. Thus, transfer of energy from the power supply stations via the power line section to the energy storage means when the power line section is substantially at said nominal voltage is reduced or avoided altogether.

In an embodiment the integrated system further comprises a converter conductively connected between said energy storage means and said plurality of charging stations, for converting electrical energy from said energy storage means to a voltage suitable for said charging stations. The converter and the plurality of charging stations are preferably located within a distance of 2 km from a railway station, preferably within a distance of 1 km, most preferably within a distance of 500 m thereof.

In an embodiment the energy storage means are stationary during said transfer of electrical energy from the electrical energy storage means to the group of electrically powered bus vehicles or onboard batteries thereof.

In an embodiment, the energy transfer from the energy storage means to the group electrically powered buses is performed within a distance of 2 km of the energy storage means, preferably within a distance of 1 km, instead of within a distance of 500 m from the energy storage means.

In an embodiment said vehicles from said group of rail vehicles are adapted for receiving electrical energy at substantially said nominal voltage, for powering movement of said rail vehicle. The rail vehicles may thus draw energy from the energy storage means without requiring the use of a voltage converter. The rail vehicles may moreover be adapted for receiving electrical energy at a voltage within a nominal voltage range which comprises said nominal voltage. For instance, the rail vehicles may each comprise an electromotor for driving movement of said vehicle over a track when provided with electrical energy within the nominal voltage range, e.g. within a nominal voltage range of 1.400 V—1.700 V, for instance at a nominal voltage of 1.500 V.

In an embodiment each rail vehicle is provided with an electromotor for driving movement of said vehicle over a track, wherein said electromotor can also be operated as the regenerative braking means of said rail vehicle.

In an embodiment in which the power line section is also used to provide electrical energy to the rail vehicle from other sources than the electrical storage means, e.g. from power supply stations arranged on either side of the power line section, the electrical energy storage means function as a voltage regulator for the power line section. When a rail vehicle which is powered via the power line section moves at a substantially constant speed, it draws substantially constant energy from the power line and the voltage on said power line section is typically substantially constant as well. The voltage on the power line section drops when more electrical energy is drawn by the rail vehicle, for instance when accelerating, and rises when electrical energy is supplied to the power line section by the regenerative braking means of the rail vehicle. When the energy storage means is directly connected to the power line section it smoothes the voltage of the power line section.

For example, a rail vehicle is adapted to operate within a voltage range between 1.400 and 2.100 V, and typically receives a voltage of about 1.500 V when drawing a substantially constant amount of energy per unit time, e.g. when traveling at constant speed. During braking of the vehicle its regenerative braking means supply electrical energy via the power line section to the energy storage means at 1.800 V. When, at a later time, a rail vehicle draws energy from the electrical energy storage means this energy is automatically supplied within the operating voltage range of the rail vehicle, without requiring any conversion.

In an embodiment said power line section is arranged at a location where braking and/or deceleration of said rail vehicles of said group of rail vehicles frequently occurs, for instance at a railway station, at a corner section of a track, at a railroad crossing which is located within 2 km of a bus station, and so on.

In an embodiment said integrated system further comprises a converter conductively connected between said energy storage means and said plurality of charging stations, for converting electrical energy from said energy storage means to a voltage suitable for said charging stations. For instance, the converter, e.g. a super charger, may be adapted for converting the electrical energy it receives from the energy storage means and/or from the power line section to a voltage between 400 to 600 V and a current substantially equal to 350 Ampere, for charging onboard batteries of the buses. The converter preferably only converts electrical energy to a voltage which is suitable for said charging stations when required, i.e. when electrical energy is supplied to the onboard batteries of the buses.

In an embodiment the integrated system further comprises switching means adapted for individually switching either on or off: a first connection between the power supply line and the converter, a second connection between the power supply line and the energy storage means, and a third connection between the energy storage means and the converter. These connections are conductive connections through which electrical energy generated by braking of a rail vehicle may be transported.

When the first and second connections are switched off while the third connection is switched on, then the busses can be provided with energy from the energy storage means through the converter until substantially all of the stored in the energy storage means is consumed. In this configuration, no energy is supplied from the power line section to either the energy storage means or to the converter. As long as there is sufficient energy stored in the energy storage means, the energy storage means can still provide electrical energy to the converter, so that the buses can be charged. Thus even when the trains malfunction, or otherwise no regenerative braking energy is supplied to the energy storage means, the buses can still recharge at the charging stations, preferably during at least a further predetermined period of time. Typically, there is sufficient energy stored in the energy storage means for providing power consumed by the buses during said further predetermined period of time, when the energy storage means is charged to at least 75% of its maximum capacity. This further predetermined period of time is preferably equal to at least a third of the predetermined time period, e.g. when the predetermined time period is 18 hours, then the further predetermined time period is preferably at least 6 hours.

In case the energy storage means is unable to store or provide electrical energy, e.g. during malfunction or when substantially no electrical energy is stored therein, the second and third connections may be switched off while the first connection is switched on, so that the converter is directly supplied with the energy from the power line section and can thus supply the buses with electrical energy. The buses may thus be kept in operational revenue service when the energy storage means are disconnected from the converter and the power line section.

When the first and third connections are switched off while the second connection is switched on, then electrical energy generated during braking of a rail vehicle is stored in the energy storage means. In this configuration there is no transport of energy from the energy storage means to the converter for charging the onboard batteries of the buses, and there is no transport of energy from the power line section to the converter. In this configuration the energy storage means may be fully charged quickly, e.g. within about 2-4 hours.

In case of an emergency the switching means are adapted to switch all connections off, thus reducing the risk of electrical shock to emergency and/or repair workers.

In an embodiment, the switching means comprises a conductive junction having at least three legs, wherein a first leg of said conductive junction comprises a first switch connected to the power line section, a second leg of said conductive junction comprises a second switch connected to said energy storage means, and a third leg of said conductive junction comprises a third switch connected to said converter. When the switches of the first and second leg are on, electrical energy may transfer from the power line section to the energy storage means or vice versa. When the switches of the second and third leg are on, power may be transferred from the energy storage means to the converter. When the switches of the first and third legs are on, power may be transferred directly from the power line section to the converter.

In an embodiment said power line section, said electrical energy storage means, said converter and said plurality of charging stations are located within a distance of 2 km from such a location, preferably within a distance of 1 km, most preferably within a distance of 500 m thereof.

In an embodiment the electrical energy storage means is adapted for one way exchange of electrical energy from said electrical energy storage means to said charging station. This may be achieved for instance using a rectifier arranged between the electrical energy storage means and the charging stations.

In an embodiment each of said charging stations is adapted for making sliding or rolling conductive contact with an electrically powered bus. The onboard batteries of said electrically powered buses may thus be at least partially charged while moving relative to the charging station, e.g. when a number of said buses is lined up in a queue. Preferably, during charging, each bus makes conductive contact with at least two conductors, one for carrying a current from the charging station to the bus, and one return conductor.

In an embodiment each of said charging stations comprises an overhead conductor line for providing electrical energy to an onboard battery of an electrically powered bus. Preferably each of said charging stations comprises two overhead conductor lines for connecting with a an electrically powered bus, one line for carrying current from the charging station to the bus, and one return line.

In an embodiment said electrically powered buses are each provided with a pantograph for receiving electrical energy from the overhead conductor line. Additionally, or alternatively, the electrically powered buses may be provided with two trolley poles, one for conductive connection with a current carrying overhead conductor line of a charging station, and one for connection with an overhead return line of a charging station.

In an embodiment said system comprises said group of rail vehicles and/or said group of electrically powered buses. This facilitates estimating in advance the net energy that will be generated by the group of rail vehicles and/or the energy consumption of the group of electrically powered buses during a predetermined period of time.

In a preferred embodiment, at least during the predetermined period of time, substantially all energy stored in the electrical energy storage means is provided thereto via the power supply line. The energy storage means can thus function substantially independent of an electrical grid connected to power supply stations, which grid is not part of the integrated system of the invention.

According to a third aspect, the present invention provides an energy distribution and consumption system for use with a first group of vehicles comprising rail vehicles which are provided with regenerative braking means for generating electrical energy during braking, and a second group of vehicles comprising electrically powered buses, each bus comprising an electromotor for driving movement of wheels thereof and an onboard battery connected to said electromotor, said system comprising: a power line section, arranged for receiving electrical energy generated by the regenerative braking means of a rail vehicle of said first group during braking of said rail vehicle; an electrical energy storage means connected to said power line section and adapted for storing electrical energy received by said power line section during braking of said rail vehicle; a plurality of charging stations, each adapted for connecting to a vehicle from said second group, for charging the onboard battery thereof with electrical energy from said electrical energy storage means; wherein said first group of vehicles is adapted for providing a substantially predetermined net supply of electrical energy to said electrical energy storage means during a predetermined time period, wherein said second group of vehicles is adapted for substantially consuming at least said net amount of electrical energy within said predetermined time period; and wherein said power line section, said electrical energy storage means, and said plurality of charging stations form an integrated system and are located within a distance of 10 km from each other, preferably within a distance of 4 km, most preferably within a distance of 1 km. During the predetermined time period, e.g. an 18 or 24 hour time period during which rail vehicles and buses are scheduled in revenue service, there are several times during which energy is supplied to the electrical energy storage means by the rail vehicles, and is consumed in a more gradual manner by the vehicles from the second group. For instance, during a predetermined time period which lasts about 18 hours, on average at least 4 braking actions may occur each hour. During the same predetermined time period, vehicles from the second group may succeed each other at the charging stations, so that substantially at any time during the predetermined time period at least one vehicle from the second group is provided with energy from the energy storage means.

In an embodiment the electrical energy generated during braking or decelerating of a rail vehicle of the first group of vehicles is used to power at least two electrically powered buses, preferably at least four, more preferably at least 6 electrically powered buses of the second group of vehicles during the predetermined time period.

In an embodiment the integrated system further comprises switching means adapted for individually switching either on or off: a first connection between the power supply line and the converter, a second connection between the power supply line and the energy storage means on or off, and a third connection between the energy storage means and the converter. These connections are conductive connections through which electrical energy generated by braking of a rail vehicle may be transported.

When the first and second connections are switched off while the third connection is switched on, then the busses can be provided with energy from the energy storage means through the converter until substantially all of the stored in the energy storage means is consumed. In this configuration, no energy is supplied from the power line section to either the energy storage means or to the converter. As long as there is sufficient energy stored in the energy storage means, the energy storage means can still provide electrical energy to the converter, so that the buses can be charged. Thus even when the trains malfunction, the buses can recharge at the charging stations. Preferably, when the energy storage means is charged to at least 75% of its maximum capacity, sufficient energy is stored therein for providing power consumed by the buses during a further predetermined period of time. This further predetermined period of time is preferably equal to at least a third of the predetermined time period, e.g. when the predetermined time period is 18 hours, then the further predetermined time period is 6 hours In case the energy storage means is unable to store or provide electrical energy, e.g. during malfunction or when substantially no electrical energy is stored therein, the second and third connections may be switched off while the first connection between is switched on, so that the converter is directly supplied with the energy from the power line section and can thus supply the buses with electrical energy. The buses may thus be kept in operational revenue service when the energy storage means are disconnected from the converter and the power line section.

When the first and third connections are switched off while the second connection is switched on, then electrical energy generated during braking of a rail vehicle is stored in the energy storage means. In this configuration there is no transport of energy from the energy storage means to the converter for charging the onboard batteries of the buses, and there is no transport of energy from the power line section to the converter. Typically in this configuration it takes about 2-4 hours for the energy storage means to be fully charged.

In case of an emergency the switching means are adapted to switch all connections off, thus reducing the risk of electrical shock to emergency and/or repair workers.

In an embodiment, the switching means comprises a conductive junction having at least three legs, wherein a first leg of said conductive junction comprises a first switch connected to the power line section, a second leg of said conductive junction comprises a second switch connected to said energy storage means, and a third leg of said conductive junction comprises a third switch connected to said converter.

In an embodiment said energy storage means is adapted for collecting and/or releasing electrical energy from and/or to said power line section at said predetermined voltage range for at least 40 seconds, preferably for at least 60 seconds.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1A:
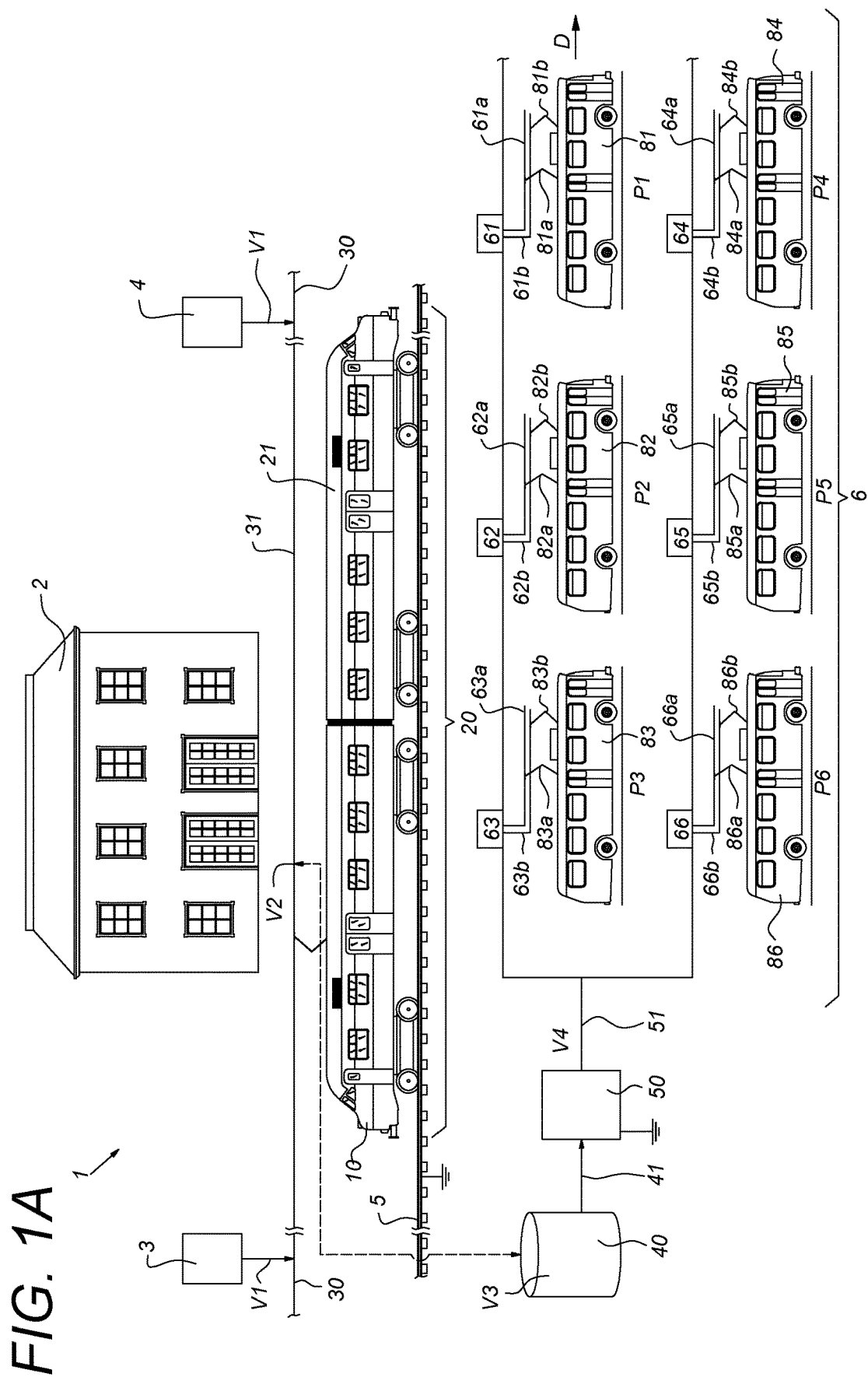
FIG. 1A shows a schematic view of an energy distribution and consumption system according to the present invention.
Figure 1B:
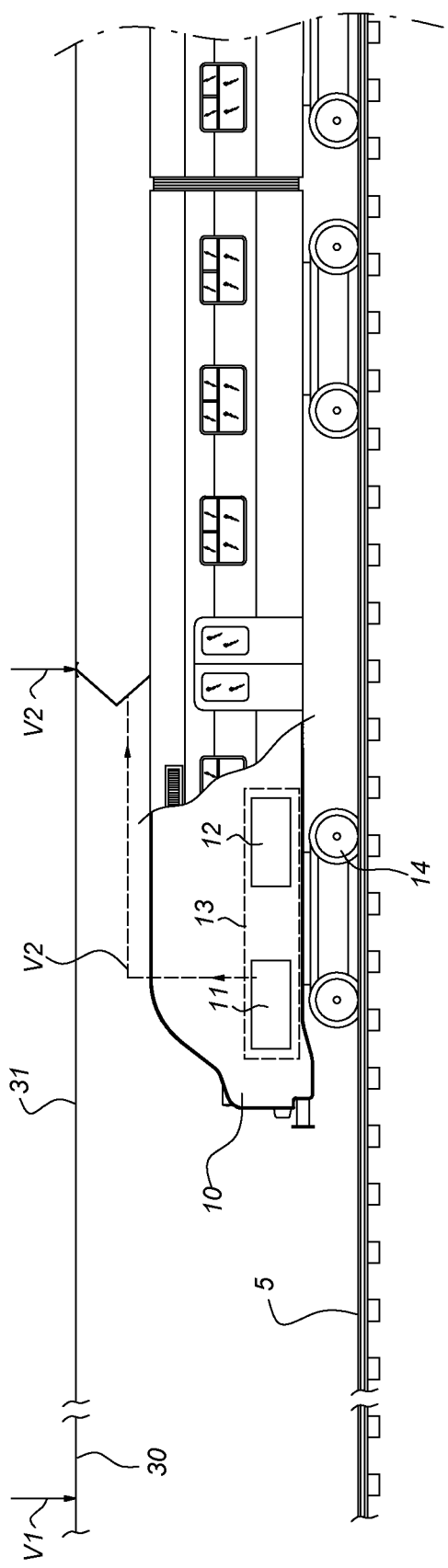
FIG. 1B shows a detail of a section of FIG. 1A, showing a partially a cut-away view of a rail vehicle.
Figure 1C:
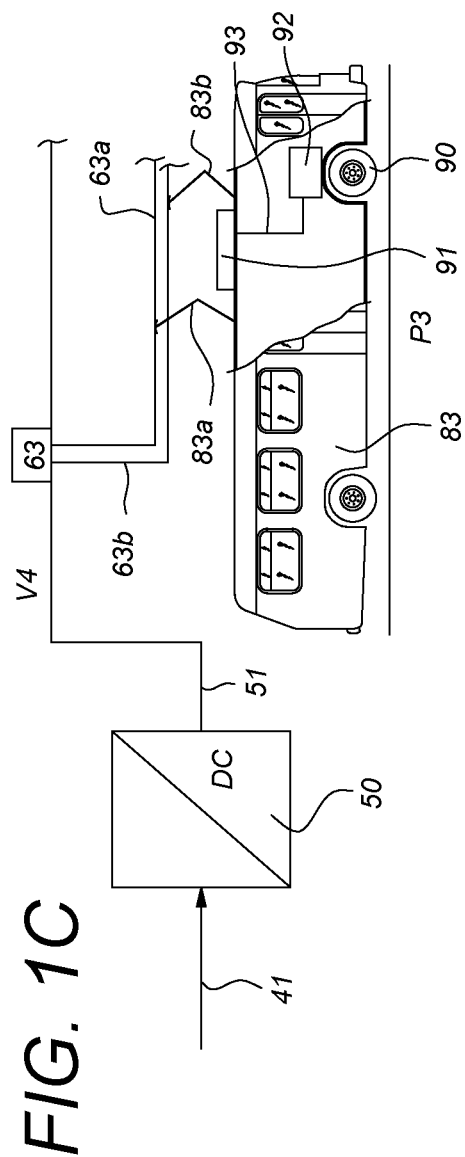
FIG. 1C shows another detail of a section of FIG. 1A, showing a partially a cut-away view of an electrically powered bus.

FIG. 1A shows a schematic view of a first embodiment of an energy distribution and consumption system 1 according to the present invention. FIGS. 1B and 1C respectively show detailed and partially cut-away sections of the rail vehicle 20 and electrically powered bus vehicle 83 as shown in FIG. 1A. The system 1 is arranged proximate to a railway station 2 at which rail vehicles such as rail vehicle 20, frequently accelerate and decelerate, for instance for taking on and dropping off passengers, and/or for loading or unloading cargo from the rail vehicles. The train or rail vehicle 20 is electrically powered and comprises a motorized rail vehicle 10 which is provided with a electrical motor 11 (see FIG. 1B) for driving rotation of the wheels 14 of the motorized rail vehicle 10 over the rail or track 5. The motorized rail vehicle 10 further comprises an inverter 12, which together with the motor 11 forms regenerative braking means 13 for converting braking energy of the rail vehicle 10 into electrical energy. The regenerated electrical energy is transferred via an overhead conductive power line section 31, or power supply section, to electrical energy storage means 40 which is located close to the railway station 2, i.e. within 2 km thereof. Both the energy storage means 40 and the track 5 are conductively connected to ground, so that return circuits may be formed for electrical energy. The rail vehicle 20 further comprises at least one train car 21 for accommodating passengers and/or holding cargo.

When the motorized rail vehicle 10 is driving at constant speed or is accelerating, the electromotor 11 is provided with electrical energy via a power supply line 30 of which the power line section 31 is a part. The power line section 31 is connected at both its ends to power supply stations 3,4 which are arranged along the track 5 at about 4 km or so from each other, and which are adapted for providing electrical energy at a nominal substantially constant voltage V1 at their points of contact with the power line section 31. As the power supply stations 3,4 are spaced apart over a relatively large distance, a voltage drop may occur on the power line section 31 between the power supply stations 3 and 4, in particular near the middle of said power line section. For conventional rail vehicles the voltage supplied by the power supply stations 3,4 is typically substantially equal to 1.500 V.

Though in the embodiment shown the rail vehicle 10 is electrically powered, other kinds of rail vehicles which are powered by other means may be used instead. For instance instead of the motorized rail vehicle 10 which receives electrical energy via the power line section 31 as shown in FIG. 1A, a diesel-electric powered rail vehicle comprising a diesel engine which generates electricity for driving an electromotor of the rail vehicle may be used, or a rail vehicle comprising a combustion engine for directly and mechanically driving rotation of the wheels of the rail vehicle may be used. The rail vehicle or at least one of its railcars should however be provided with regenerative braking means.

FIG. 1B shows a partially cut-away detail of the motorized rail vehicle 10 of FIG. 1A. When the rail vehicle 10 brakes or reduces speed its regenerative braking means 13 generates electrical energy. For instance, in the embodiment shown, the regenerative braking means 13 of rail vehicle 10 may generate electrical energy at a voltage V2 of 1.800 Volts and a current A2 of 4.000 Ampere while braking for about 60 seconds. Braking takes place substantially within the length of the power line section 31, and the amount of electrical energy generated during braking is in this example substantially equal to 1.800V*4.000 A*(60 s/3.600 s)=120 kWh. This electrical energy is transported from the regenerative braking means 13 of the rail vehicle 10, via the power line section 31, to the electrical energy storage means 40 which stores the electrical energy at a voltage V3 which is substantially equal to or slightly lower than the voltage V1. Because the voltage V3 at which the electrical energy is stored in the energy storage means 40 is substantially equal to or lower than the nominal voltage V1 supplied to the power line section 31 by the power stations 3,4, in general no energy is transferred from the energy storage means 40 to the power line section 31 when no rail vehicles are accelerating along the power line section 31.

To enable storage of the electrical energy in the energy storage means 40 during the relatively short time it takes for a rail vehicle to brake, the energy storage means 40 shown in FIG. 1A is adapted for storing at least 15 times, preferably at least 20 times the electrical energy that is typically generated during braking of a single rail vehicle 20. Based on the braking energy of 120 kWh in the example above, the energy storage means 40 is thus dimensioned for storing at least 1.8 MWh, preferably at least 2.4 MWh of electrical energy.

The energy storage means 40 is connected via a one way connection 41, for example comprising a rectifier, to an electrical energy converter 50, which is connected in turn via one or more conductive leads 51 to a number of charging stations 61-66. Though only six charging stations are shown for concurrently charging a same number of electrically powered buses 81-86, the actual number of charging stations is typically chosen such that a sufficient number of electrically powered buses can be charged by the charging stations 61-66 for consuming at least a net amount of electrical energy supplied to the energy storage means 40 by railway vehicles which brake or decelerate at the railway station 2 or along the power line section 31, during a predetermined time period.

The electrical energy converter 50, which is connected between the energy storage means 40 and the charging stations 61-66, is adapted for converting the electrical energy which is supplied thereto from the energy storage means 40 at voltage V3 into electrical energy at a lower voltage V4, which is suitable for charging onboard batteries of electrically powered bus vehicles 81-86. The voltage V4 is typically lower than the voltage V3, at least by a factor 4.5. In the embodiment shown, the voltage V4 with which the charging stations 61-66 charge the bus vehicles 81-86 lies in the range of 400-600 V, and the charging current is substantially equal to 350 A.

Each charging station 61-66 comprises a pair of overhead conductor lines 61a-66a and corresponding return lines 61b-66b for supplying electrical energy to a corresponding vehicle 81-86 at a substantially predetermined position P1-P6 with respect to said charging station. The electrically powered buses 81-86 at the charging stations are each provided with an electromotor 92 (see FIG. 1C) for driving movement of said buses, and each provided with an onboard battery 91 for storing electrical energy, as shown in FIG. 1C. Each of the electrically powered buses further comprises two respective pantographs 81a,81b, 82a,82b, 83a,83b, 84a, 84b, 85a,85b and 86a,86b for conductively connecting to respective overhead conductor lines 61a,61b-66a,66b of the respective charging stations. The charging stations 61-63 and 63-65 are arranged in queues, such that when buses 81,82 and 83 or buses 84,85 and 86 form a queue while waiting for passengers to get on or off the bus, the onboard batteries of these buses can be charged at the same time. When bus 81 leaves position P1 in the queue, buses 82 and 83 may move forward in the same queue from positions P3 and P2 to positions P2 and P1 respectively, to have their onboard batteries further charged at charging stations 62 and 61 respectively.

Each bus typically makes several round trips during the predetermined time period, returning to one of the charging stations after each trip. While the bus is at a charging station position P1-P6 waiting for passengers to get on or off the bus, the onboard battery of the bus is partially recharged. The onboard batteries of the buses are not necessarily completely recharged when stopping at the bus station 6 to pick up or drop off passengers. Preferably, at the beginning of the day, the onboard batteries of the electrically powered buses are substantially completely charged, and the energy stored in the onboard batteries decreases gradually during the day, except for relatively brief times, e.g. during 5 or 3 minutes, during which passengers can get on or off a bus, and during which that bus is partially recharging its onboard battery at a charging station at the bus stop 6.

Figure 2:
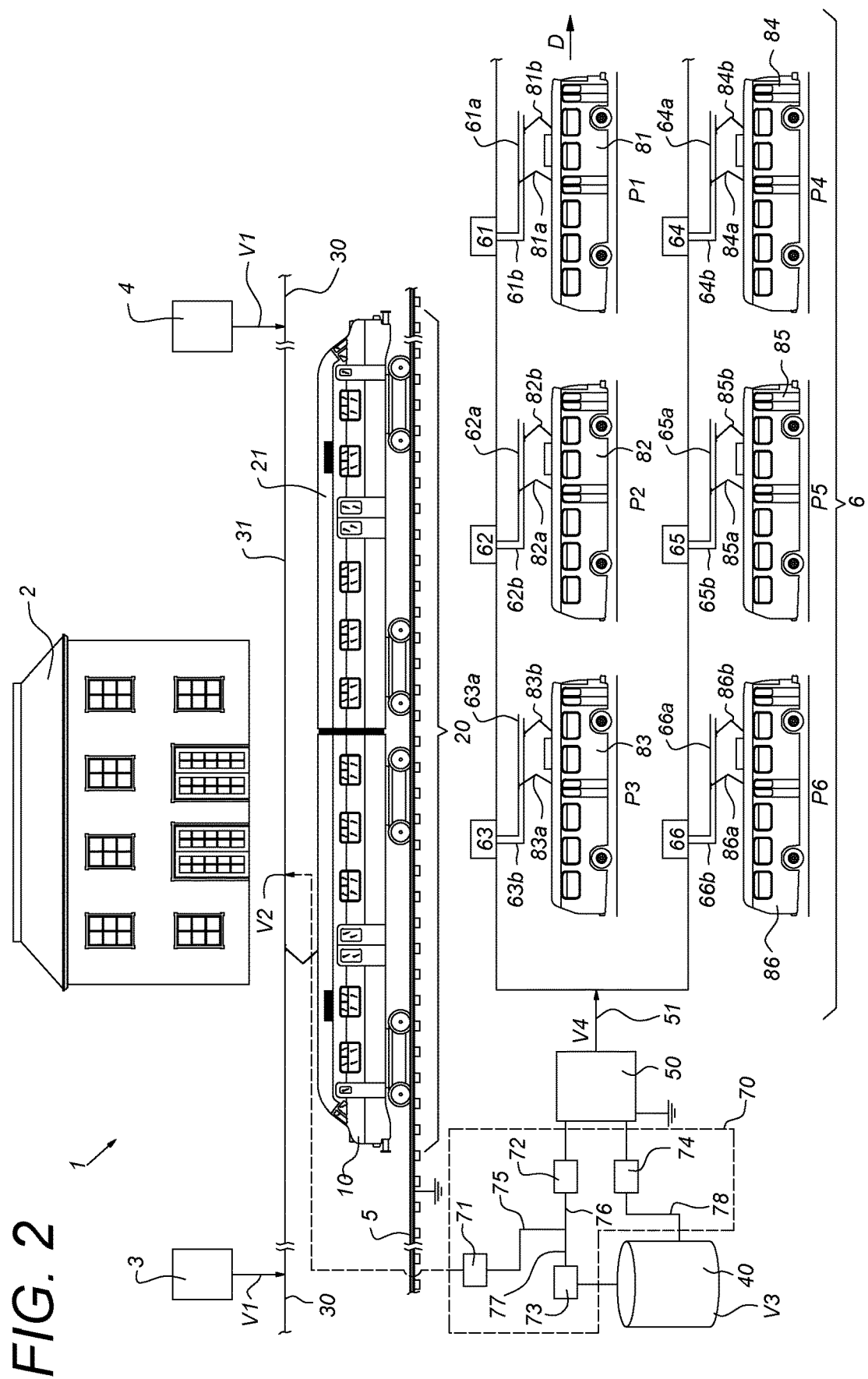
FIG. 2 shows a second embodiment of a system according to the present invention, FIG. 3 schematically shows a graph of energy stored in the energy storage means, energy regenerated by regenerative braking means, and energy consumed by the electrically powered buses, vs time.

FIG. 2 shows a schematic view of a second embodiment of a system according to the present invention, in which like reference numbers refer to like elements as in FIG. 1. The second embodiment further comprises switching means 70, for individually switching connections between the power line section 31, the energy storage means 40 and the converter 50 on or off.

The switching means 70 comprise a conductive junction having at least a first, second and third conductive leg 75,76,77. The first leg 75 of the conductive junction 70 comprises a first switch 71 connected to the power line section 31 on one side and the conductive junction on the other side. The second leg 76 of said conductive junction comprises a second switch 72 connected to said converter 50 on one side and to the conductive junction on the other side. The third leg 77 of the conductive junction comprises a third switch 73 connected to said energy storage means 40 on one side and to the conductive junction on the other side.

By individually switching the switches 71-73 on or off, i.e. placing the switches in a conductive state or a non-conductive state respectively, the route which electrical energy can travel in the switching means can be set. The switching means 70 are adapted for closing the first switch 71 and the third switch 73 during braking of a rail vehicle, while keeping the second switch 72 open. Thus conductive connections are formed between the power line section 31 and the energy storage means 40 during braking of the rail vehicle, such that the energy generated by the regenerative braking means can be stored in the energy storage means 40. The switching means 70 are further adapted for closing the second switch 72 and either one or both one of the first and third switches 71, 73, when one or more electrically powered buses are charging their onboard batteries. When the second switch 72 and the third switch 73 are closed while the first switch 71 is open, electrical energy can flow from the energy storage means 40 to the converter 50. In this case the input voltage range that the converter must be able to handle can be relatively narrow, i.e. substantially equal to the nominal voltage of the energy storage means 40. When the first switch 71 and the second switch 72 are closed while the third switch 73 is open, electrical energy generated by a rail vehicle that is braking along the power line section 31 can be directly transferred to the converter 50, which then has to be able to handle a broader range of input voltages than the narrow range mentioned above.

The switching means 70 are further adapted for opening the first, second and third switches during maintenance and/or during malfunction of a portion of the system.

In the embodiment shown, the switching means 70 further comprises a fourth switch 74, for switching a connection between ground of the converter 50 and the energy storage means 40 either on or off.

Figure 3:
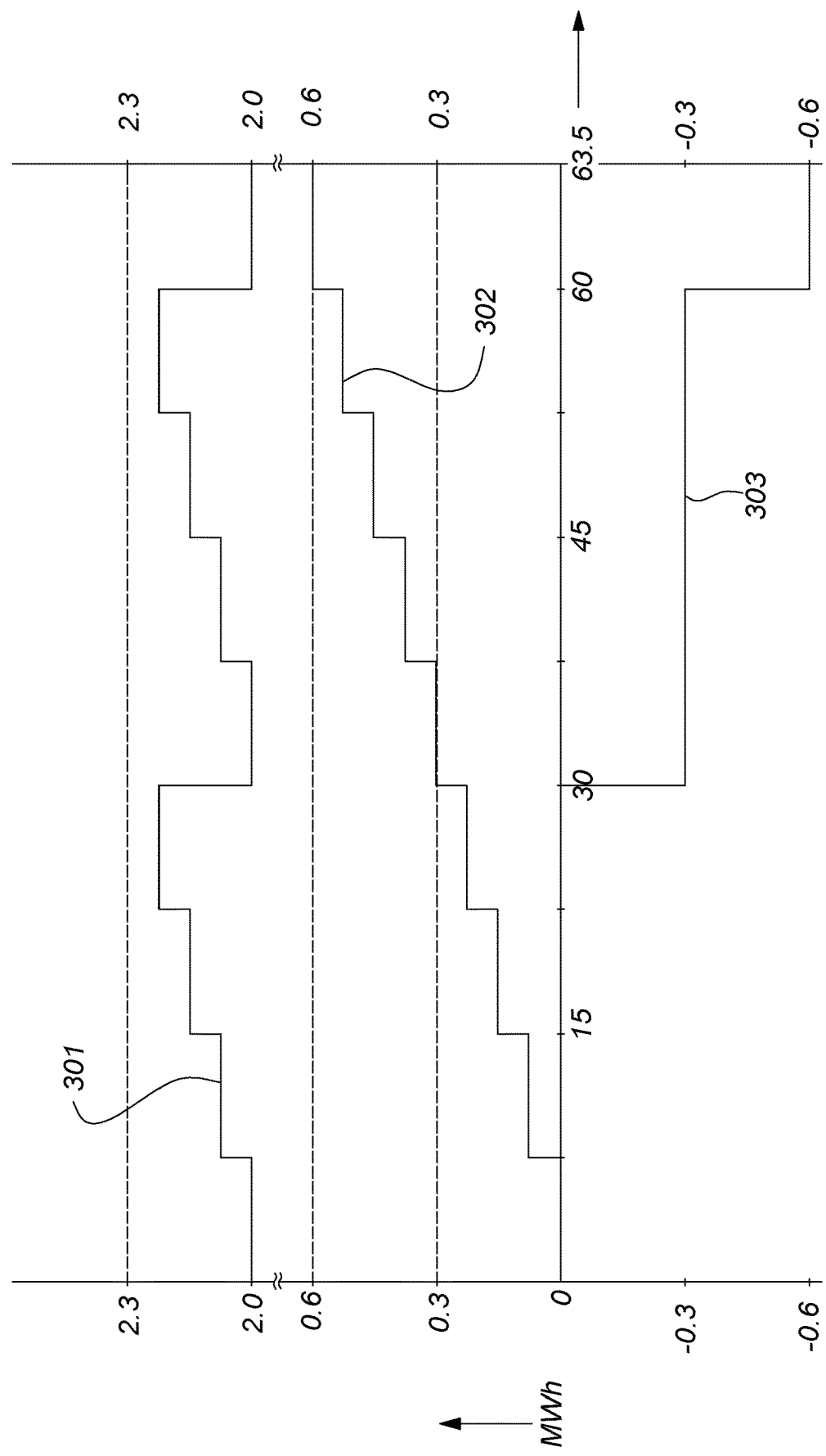

FIG. 3 schematically shows graphs of energy stored in the energy storage means 301, energy regenerated by regenerative braking means 302, and energy consumed by the electrically powered buses 303, all vs time. The time scale shown spans 63.5 minutes. At the beginning of the time scale, at time t=0, the energy storage means store are at about 80% capacity, storing 2 MWh of electrical energy. Starting at 7.5 minutes past the hour a railway vehicle brakes at a railway station every 7.5 minutes, generating 75 kWh of electrical energy during braking. Thus, 30 minutes after t=0 four rail vehicles have braked at the railway station, and a total of 0.3 MWh of electrical energy has been generated by the regenerative braking means of the rail vehicles and added to the energy storage means. Starting at 30 minutes past the hour, a number of electrically powered buses arrive at substantially the same time at charging stations in the vicinity of the railway station, and start drawing about 0.30 MWh of energy from the energy storage means so that the amount of electrical energy stored in the storage means drops back to 2 MWh. The process of addition of energy to the energy storage means by braking rail vehicles and drawing of energy from the energy storage means by the electrically powered buses may repeat during the entire pre-determined time period.

Figure 4:
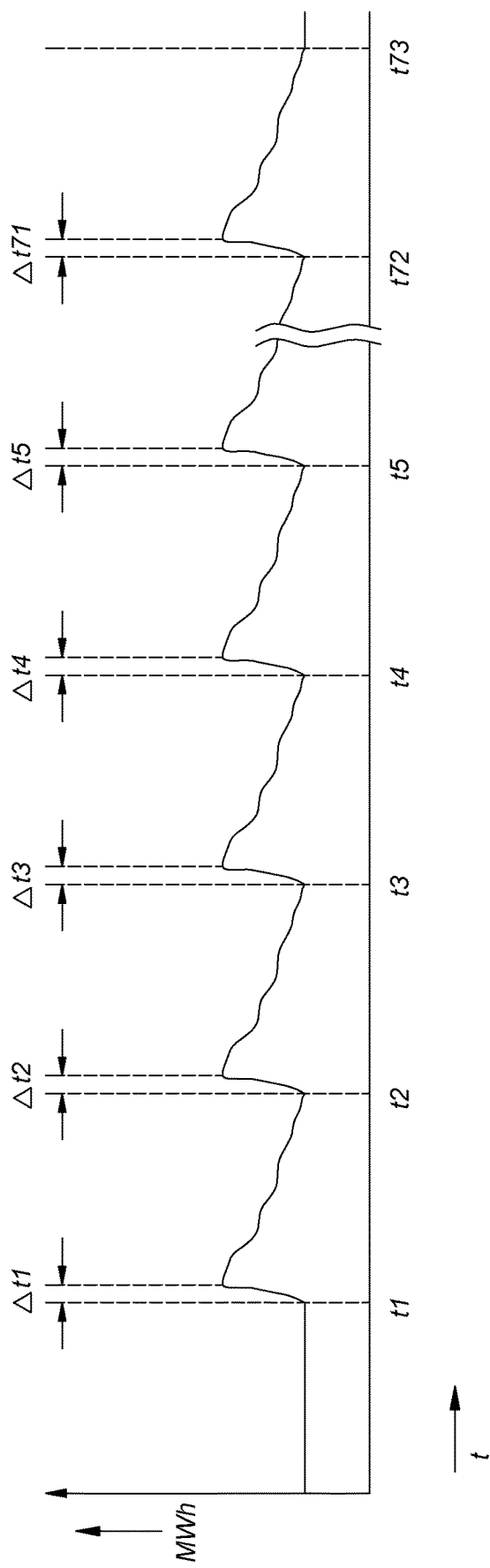
FIG. 4 shows a graph of energy stored in the energy storage means over a predetermined amount of time.

FIG. 4 shows a schematic graph of the amount of electrical energy stored in the energy storage means over a predetermined period of time spanning 18 hours. During this time period there are a number of predetermined moments $t1 \ldots t72$ at which a rail vehicle starts braking in the vicinity of a railway station and provides electrical energy to energy storage means at said railway station. In the graph of FIG. 4, there are 72 such moments $t1 \ldots t72$, which occur at intervals of 15 minutes or so.

Each time $t1 \ldots t72$ a rail vehicle brakes, the amount of energy stored in the energy storage means peaks for a duration of time $\Delta t1 \ldots \Delta t72$ it takes for the rail vehicle to brake, which is typically about 1 minute but may vary somewhat, e.g. $\Delta t1$ may last 70 seconds whereas $\Delta t2$ and $\Delta t3$ may last 55 and 65 seconds respectively. In either case, the rail vehicle decelerates from a normal traveling train speed, e.g. 120 m/s to complete stand still while its pantograph contacts the power line section to which the energy storage means are connected.

As can be seen from the energy stored at time t1 and the energy stored at the end of the predetermined time period, i.e. fifteen minutes after t72, substantially all of the energy supplied to the energy storage means during braking or rail vehicles is used within the same predetermined time period of 18 hours, for charging onboard batteries of electrically powered buses.

The energy is supplied to the buses in a more gradual manner than it is received from the rail vehicles at the energy storage means. Whereas between substantially all energy generated during braking of a rail vehicles is supplied to the energy storage means within the sum of braking times, e.g. within 72 minutes assuming each vehicle brakes on average within a minute, all of this energy is gradually consumed by charging the buses during the entire predetermined period of time.

Figure 5A:
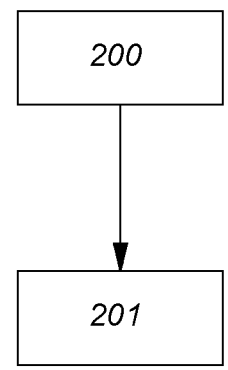
FIG. 5A shows a flowchart of a method of the present invention.

FIG. 5A shows a flowchart 250 of a method for utilizing electrical energy generated during deceleration and braking of rail vehicles, such as one or more rail vehicles provided with regenerative braking means, during a predetermined time period. In step 200 the electrical energy generated during braking by the regenerative braking means is transported to electrical energy storage means. In order to be able to receive and store the electrical energy, within the time that a rail vehicle is braking, the electrical storage means are adapted for storing at least at least 20 times the amount of electrical energy which is generated by regenerative braking means of a rail vehicle. In step 201, this electrical energy is transported from the electrical energy storage means to onboard batteries of one or more electrically powered buses, such as electrically powered buses for passenger transport.

Figure 5B:
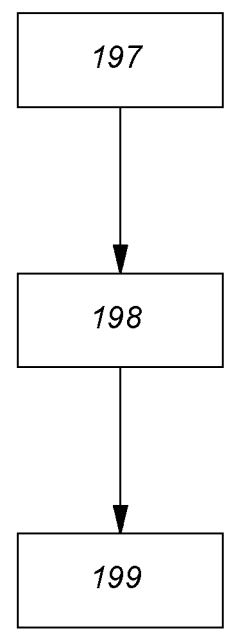
FIG. 5B shows a flowchart of another embodiment of the method of the present invention.

FIG. 5B shows a flowchart 190 of further method steps that may be performed prior to the start of the predetermined time period, for balancing the amount of energy consumed by the electrically powered buses with the amount of energy which stored in the electrical energy storage means. In step 197 an estimate is made of the amount of electrical energy which is to be generated during braking of the rail vehicles during a predetermined period of time, i.e. during at least a day, and which is to be stored in the electric energy storage means, based on a predetermined number of rail vehicles stopping at a railway station.

In step 198, an estimate is made of the energy consumption of the electric vehicles during the same period of time. In step 199 a number of electric vehicles to which the electrical energy is to be transported from the electrical storage means to the onboard batteries is calculated, based on the estimates made in step 198 and step 199, and made such that these estimates substantially correspond. Once predetermined time period has started, the method steps 200 and 201 are performed.

In summary, the present invention relates to an energy distribution and consumption system comprising: a group of rail vehicles provided with regenerative braking means; a group of electrically powered bus vehicles each comprising an onboard battery; a power line section, arranged for receiving electrical energy generated by the regenerative braking means of a rail vehicle; an electrical energy storage means connected to said power line section and adapted for storing electrical energy received by said power line section during braking of said rail vehicle; a plurality of charging stations, each adapted for connecting to a bus a vehicle, for charging the onboard battery thereof with electrical energy from said electrical energy storage means; wherein said group of rail vehicles is adapted for providing a substantially predetermined net supply of electrical energy to said electrical energy storage means during a predetermined time period, wherein said group of bus vehicles is adapted for substantially consuming at least said net amount of electrical energy within said predetermined time period.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

The invention claimed is:

1. An energy consumption and distribution system for use with a group of rail vehicles which are provided with a regenerative braking element for generating electrical energy during braking, and a group of electrically powered buses, each bus comprising an electromotor for driving movement of wheels thereof and an onboard battery connected to said electromotor, said system comprising:
a power line section, arranged for receiving electrical energy generated by the regenerative braking element of a rail vehicle of said group of rail vehicles during braking of said rail vehicle, wherein said power line section is connected at either end to a power supply station adapted for applying a nominal voltage to said power line section for powering a rail vehicle of said group of rail vehicles,
an electrical energy storage element which is directly connected to said power line section allowing uninterrupted a free flow of electrical energy from the energy storage element to the power line section and from the power line section to the energy storage element, wherein said electrical energy storage element is adapted for storing electrical energy received by said power line section during braking of said rail vehicle, wherein the energy storage element is dimensioned for storing at least 1.8 MWh of electrical energy,
a plurality of charging stations, each adapted for connecting to an electrically powered bus from said group of electrically powered buses, for charging the onboard battery thereof with electrical energy from said electrical energy storage element,
wherein said electrical energy storage element, said power line section and said plurality of charging stations form an integrated system and are located within a distance of 2 km from each other,
wherein said regenerative braking element is adapted for generating said electrical energy within a voltage range that is higher than said nominal voltage, and
wherein said electrical energy storage element is adapted for storing said electrical energy at a voltage which is equal to or higher than said nominal voltage, wherein the higher voltage is less than the maximum voltage applied to the power line section during braking of a rail vehicle.

2. System according to claim 1, further comprising said group of rail vehicles and said group of electrically powered buses, wherein said group of rail vehicles is adapted for providing a predetermined net supply of electrical energy to said electrical energy storage element during a predetermined time period that is equal to 24 hours, wherein said system is adapted for, during said predetermined time period, transferring a net amount of energy of 2.000 kWh or more from the energy storage element to the onboard batteries of said group of electrically powered buses, and wherein said group of electrically powered buses is adapted for consuming at least said net amount of electrical energy within said predetermined time period.

3. System according to claim 2, wherein the energy storage element is adapted for storing at least 20 times the electrical energy that is typically generated during braking of a single rail vehicle.

4. System according to claim 1, wherein said electrical energy storage element is adapted for receiving electrical energy from said power line section at a voltage in said voltage range.

5. System according to claim 1, wherein said energy storage element is adapted for supplying electrical energy to said plurality of charging stations and/or said power line section, at said nominal voltage.

6. System according to claim 1, wherein said integrated system further comprises a converter conductively connected between said energy storage element and said plurality of charging stations, for converting electrical energy from said energy storage element to a voltage suitable for said charging stations.

7. Method for utilization of braking energy of a group of rail vehicles each provided with a regenerative braking device operable to generate electrical energy during braking, wherein said group of rail vehicles is adapted for providing a predetermined net supply of electrical energy to an energy storage device during a predetermined time period, wherein the energy storage device is dimensioned for storing at least 1.8 MWh of electrical energy, wherein said predetermined time period is equal to 24 hours, and wherein during said predetermined time period a net amount of energy of 2.000 kWh or more is transferred from said energy storage device to onboard batteries of a group of electrically powered buses, wherein said rail vehicles are adapted for receiving electrical energy from a power line section at a nominal voltage, wherein the energy storage device is directly connected to said power line section allowing uninterrupted a free flow of electrical energy from the energy storage element to the power line section and from the power line section to the energy storage element and adapted for storing the electrical energy at said nominal voltage or higher, wherein the higher voltage is less than the maximum voltage applied to the power line section during braking of a rail vehicle, wherein said net supply of energy is equal to an amount of energy supplied by the group of rail vehicles to the energy storage device minus an amount of energy—if any—drawn by said rail vehicles from the energy storage device during the predetermined period of time, said method, during said predetermined period of time, comprising the step of:

storing electrical energy generated during braking by the regenerative braking device in said energy storage device, wherein said energy storage device is spaced apart from said rail vehicles and said electrically powered buses, and wherein said transfer of electrical energy from said energy storage device to said group of electrically powered buses is performed within a distance of 2 km from the energy storage device.

8. Method according to claim 7, wherein the number of electrically powered buses to be powered with the electrical energy which is converted during the predetermined period of time is at least equal to the net amount of electrical energy divided by the average energy consumption of a bus of the group of electrically powered buses.

9. Method according to claim 7, wherein the energy storage device is adapted for storing at least 20 times the electrical energy that is typically generated during braking of a single rail vehicle.

10. Method according to claim 7, wherein said rail vehicles are adapted to be powered through said power line section, wherein the power line section is connected on either side to power supply stations, which power supply stations are connected to an external electricity grid, and wherein electrical power flows from said electricity grid to said power line section, but not vice versa.

11. Method according to claim 7, wherein the net amount of energy is greater by at least a factor two than a maximum energy storage capacity of the energy storage device, and wherein at least the net amount of electrical energy supplied to the energy storage device by the group of rail vehicles during the predetermined time period is consumed by the group of electrically powered buses during the same predetermined time period.

12. Method according to claim 7, wherein a difference between a maximum and minimum amount of energy stored by the energy storage device during the predetermined time period at any time is less than a maximum energy storage of the energy storage device, at least by a factor 10.

13. Method according to claim 7, wherein the energy storage device has a capacity rating between 2.5C and 3.5C.

14. Method according to claim 7, wherein the onboard batteries of the electrically powered buses are dimensioned for storing an amount of energy which is at least equal to a maximum power usage of said buses times 1 hour and divided by 2.5.

15. Method according to claim 7, wherein said charging stations are located at corresponding bus stops, wherein said onboard batteries are partially recharged during stops of said electrically powered buses at said bus stops.

16. Method according to claim 15, wherein said charging of an electrically powered bus at said one or more charging stations is performed within a charging period of 6 minutes or less, after which said electrically powered bus remains disconnected from said charging stations for at least 8 times said charging period.

17. Method according to claim 7, wherein a voltage of said electrical energy from said electrical energy storage device is converted, at a position spaced apart from said electrical energy storage device, to a voltage suitable for charging said onboard batteries of said electrically powered buses.

18. Method according to claim 7, wherein said electrical energy generated by the regenerative braking device of said group of rail vehicles is used to charge at least 10 of said electrically powered buses during said predetermined time period.

* * * * *